April 2, 1940.    M. W. HUMPHREYS    2,196,072
ELECTRIC MOTOR
Original Filed Nov. 23, 1937
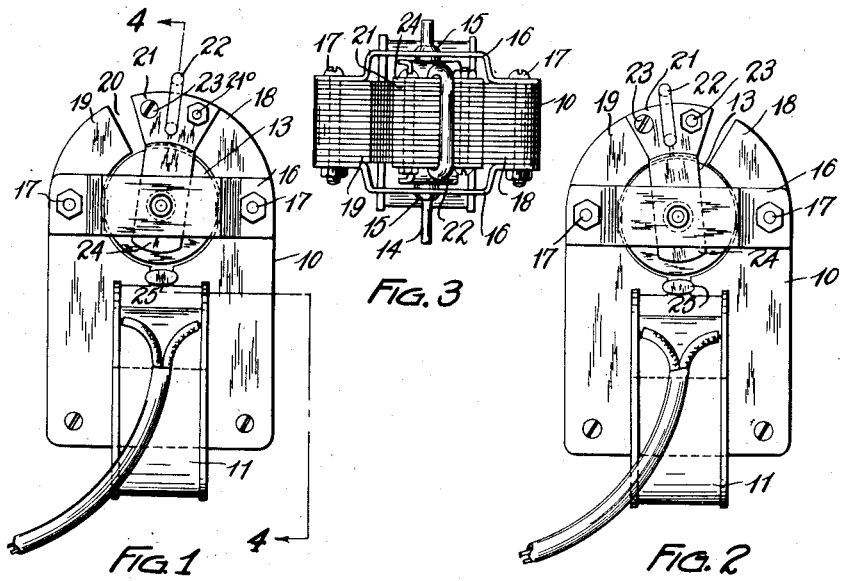
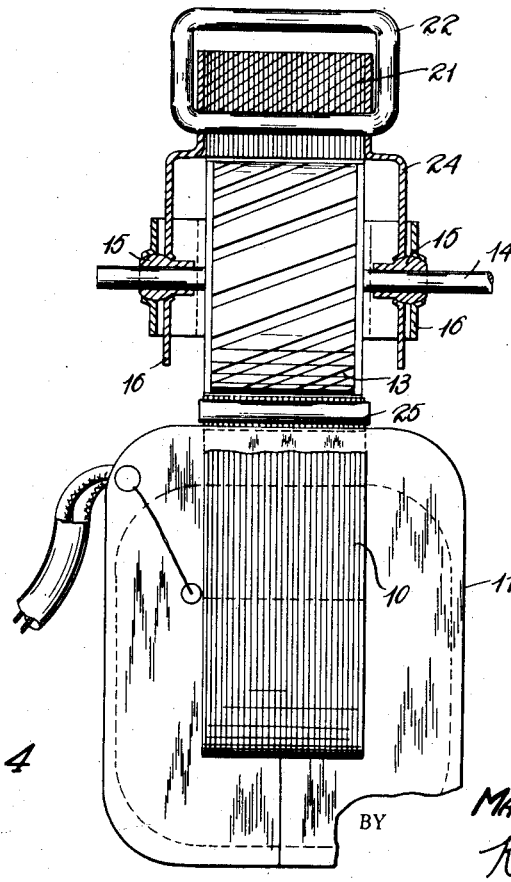
INVENTOR.
MARION W. HUMPHREYS
BY Kwis Hudson & Kent
ATTORNEYS Patented Apr. 2, 1940

2,196,072

UNITED STATES PATENT OFFICE 2,196,072

ELECTRIC MOTOR

Marion W. Humphreys, Euclid, Ohio

Application November 23, 1937, Serial No. 176,029
Renewed August 24, 1939

3 Claims. (Cl. 172—278)

This invention relates to a self-starting reversible single-phase alternating current motor of the induction type, and has for its object to provide a motor which can be built inexpensively and which has simple easily operated means for causing the motor to start in either direction and for at will varying its direction of rotation.

The invention may be further briefly summarized as consisting in certain novel details of construction and combinations and arrangements of parts which will be described in the specification and set forth in the appended claims.

In the accompanying sheet of drawings wherein I have shown a two-pole motor embodying the principle of my invention, Fig. 1 is a side elevation of the motor with a pivoted core section in position for starting and for rotation in one direction;

Fig. 2 is a similar view showing the core section in position for starting and for rotation in the opposite direction;

Fig. 3 is a top plan view; and

Fig. 4 is an enlarged sectional view substantially along the irregular line 4—4 of Fig. 1.

Referring now to the drawing, my improved motor, which is of the two-pole type, includes a laminated stator core 10 with a leg portion which receives the field coil 11 adapted to be energized by single-phase alternating current. Above the leg portion holding the coil 11 the core is shaped to form two arc-shaped pole faces which are concentric with and are separated by a narrow gap from the surface of the rotor 13 which is of the squirrel cage type and consists of a cylindrical laminated core having at its cylindrical surface conductor bars joined to end plates in any of the usual ways. The rotor 13 is mounted on a shaft 14 which rotates in self-aligning bearings 15 supported in part by two bearing brackets 16 which are secured by bolts 17 to the pole portions of the core on opposite sides of the rotor axis.

The core 10 has two pole ends 18 and 19 which are separated by a gap 20 of predetermined extent. Movable in this gap, preferably with an arcuate movement concentric with respect to the motor axis, is a movable core section 21 which is of the same cross-sectional shape as that of either pole end 18 or 19. This core section 21 is preferably wedge-shaped and of less arcuate length than that of the gap 20 between the pole ends 18 and 19. It is formed of laminae the same as the core 10 and is movable from the position shown in Fig. 1 for starting and rotation in one direction to the position shown in Fig. 2 for starting and rotation in the opposite direction. When it is in the position shown in Fig. 1, it is in engagement with the pole end 18 and in effect forms a continuation of the pole end 18, and when it is in the position shown in Fig. 2, it contacts with the pole end 19 and in effect forms a continuation of the latter.

This movable core section 21 carries a shading coil 22 which is located about midway of the core section and is preferably a closed conductor embracing somewhat more than one-half of the cross-sectional area of the core section.

The core section 21 is mounted to swing from one operating position to the other about the axis of the motor, as previously stated, and for this purpose there are secured to opposite sides thereof by through bolts 23 a pair of supporting plates 24 which extend radially and are mounted to turn on the self-adjusting shaft bearings 15. These through-bolts 23 at the same time secure together and hold in assembled relation the laminae of the movable core section as well as hold in place the supporting plates or brackets 24. Likewise, the bolts 17 have a similar dual function with respect to the laminae of the core 10 and of the shaft supporting plates or brackets 16.

The self-aligning bearings 15 have spherical portions and both the plates or brackets 16 and the plates or brackets 24 have complementary spherical portions which engage the spherical portions of the bearings 15 and thus the bearings are held in place on the shaft 14. The last mentioned feature, while desirable from the standpoint of low cost of construction, is not regarded as essential to the main feature of the invention which consists in the movable core section with its shading coil which enables the motor to be self-starting in a direction dependent upon whether the movable core section is in engagement with the pole end 18 or in engagement with the pole end 19. It might be stated finally that the gap between the poles or pole faces beneath the rotor 13, i. e., diametrically opposite the gap 20, is preferably bridged by an iron or steel slug 25, the distance between these portions of the pole faces being preferably though not necessarily substantially equal to the average width of the gap which is between the movable core section and one pole end when the core section is in engagement with the opposite pole end.

The movable core section with its shading coil can be shifted from one operative position to the other by any suitable means. It can be shifted manually in which case one of the supporting plates or brackets 24 may be provided with a lateral extension for this purpose. If desired, it can be shifted in either direction by a pair of shifting magnets either of which can be energized to shift in one direction or another the equivalent of an armature suitably connected to the movable core sections or to one of the supporting plates or brackets 24.

With this movable core section, as described, with its shading coil and adapted to be moved into engagement with either pole end so as to constitute a continuation thereof, not only will the motor start and run in a direction dependent upon the particular pole end with which the movable core section engages, but, by shifting the core section from one operative position to the other when the motor is operating at full speed, the motor can be quickly reversed in its direction of rotation, i. e., it quickly stops and starts its rotation and comes up to speed in the opposite direction.

While I have shown and described the preferred embodiment of my invention, I do not desire to be confined to the precise details described, but aim in my claims to cover all modifications which do not involve a departure from the spirit and scope of my invention in its broad aspects.

Having thus described my invention, I claim:

1. A self-starting reversible motor comprising a core having a coil and pole faces, a rotor mounted for rotation between the pole faces, the core having pole ends spaced apart, and a core section movable therebetween from one pole end to the other and having a shading coil, the width of the core section measured circumferentially of the rotor axis being less than the distance between the pole ends so that when the core section engages one pole end it is separated by an air gap from the other pole end.

2. A self-starting reversible single-phase induction motor comprising a laminated stator core having a field coil and poles, a rotor mounted for rotation between the poles, the core having spaced apart pole ends, and a laminated core section between said pole ends and having a shading coil, said core section being movable back and forth in the space between the pole ends into engagement with one or the other of said pole ends and adapted to form substantially a continuation thereof, the width of the core section measured circumferentially of the rotor axis being less than the distance between the pole ends so that when the core section engages one pole end it is separated by an air gap from the other pole end.

3. A self-starting reversible electric motor comprising a stationary laminated field core having an energizing coil and provided with a pair of poles, a rotor mounted for rotation therebetween, said pole faces being spaced from the surface of the rotor by a narrow air gap, the core having pole ends which are spaced apart, and a laminated movable core section having a shading coil, the ends of the core section and the pole ends having substantially the same configuration and area and the core section being spaced by an air gap of the same width from the rotor, said core section being movable back and forth in the space between the pole ends into engagement with one or the other of the latter and adapted to form a continuation thereof.

MARION W. HUMPHREYS.